United States Patent
Ju et al.

(10) Patent No.: US 10,210,261 B2
(45) Date of Patent: Feb. 19, 2019

(54) RANKING AND FILTERING GROUPS RECOMMENDATIONS

(71) Applicant: Facebook, Inc., Menlo Park, CA (US)

(72) Inventors: Jerry Ju, Woodinville, WA (US); Bradley Green, Snohomish, WA (US); Andrew Rocco Tresolini Fiore, San Francisco, CA (US); Antoine Joseph Atallah, Bellevue, WA (US); Jonathan Daniel Sorg, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 844 days.

(21) Appl. No.: 14/308,536

(22) Filed: Jun. 18, 2014

(65) Prior Publication Data
US 2015/0370798 A1 Dec. 24, 2015

(51) Int. Cl.
*G06F 17/30* (2006.01)
*G06Q 50/00* (2012.01)
*H04L 12/58* (2006.01)
*H04L 12/18* (2006.01)

(52) U.S. Cl.
CPC .... *G06F 17/30867* (2013.01); *G06F 17/3053* (2013.01); *G06Q 50/01* (2013.01); *H04L 12/185* (2013.01); *H04L 51/32* (2013.01)

(58) Field of Classification Search
CPC ........................ G06F 17/3053; G06F 17/30867
See application file for complete search history.

(56) References Cited

U.S. PATENT DOCUMENTS

| | | | | |
|---|---|---|---|---|
| 8,386,619 B2* | 2/2013 | Mallet | G06Q 50/01 | 709/217 |
| 8,463,295 B1* | 6/2013 | Caralis | G06Q 30/0631 | 455/414.2 |
| 8,606,787 B1* | 12/2013 | Asgekar | G06Q 50/01 | 707/737 |
| 8,738,634 B1* | 5/2014 | Roth | G06F 17/30867 | 707/748 |
| 2011/0270774 A1* | 11/2011 | Varshavsky | G06Q 10/10 | 705/319 |
| 2012/0167007 A1* | 6/2012 | Ross | G06Q 10/10 | 715/811 |
| 2012/0226651 A1* | 9/2012 | Chidlovskii | G06Q 10/10 | 706/52 |
| 2012/0233191 A1* | 9/2012 | Ramanujam | G06F 17/30867 | 707/758 |
| 2012/0246578 A1* | 9/2012 | Baldwin | G06Q 50/01 | 715/753 |
| 2013/0090163 A1* | 4/2013 | Edson | A63F 13/61 | 463/31 |

(Continued)

*Primary Examiner* — Robert W Beausoliel, Jr.
*Assistant Examiner* — Nirav K Khakhar
(74) *Attorney, Agent, or Firm* — Baker Botts L.L.P.

(57) ABSTRACT

In one embodiment, a set of user groups of a social-networking system may be accessed. A first subset of the user groups may be determined for a particular user of the social-networking system, based on one or more filtering criteria. A number of recommendation-source processes may be applied to the first subset to determine a number of second subsets of the first set. Each recommendation-source process may represent a particular recommendation source. The second subsets may be combined into a list of user groups. The list of user groups may be ranked, and sent to the particular user.

19 Claims, 10 Drawing Sheets

(56) References Cited

U.S. PATENT DOCUMENTS

| | | | |
|---|---|---|---|
| 2013/0103758 A1* | 4/2013 | Alison | G06Q 50/01 709/204 |
| 2013/0124298 A1* | 5/2013 | Li | G06Q 30/0241 705/14.42 |
| 2013/0268595 A1* | 10/2013 | Mohan | H04L 51/32 709/204 |
| 2014/0040030 A1* | 2/2014 | Winters | G06Q 30/0261 705/14.58 |
| 2014/0067967 A1* | 3/2014 | Jackson | G06Q 50/01 709/206 |
| 2014/0194208 A1* | 7/2014 | Splaine | G06Q 30/02 463/42 |
| 2014/0207801 A1* | 7/2014 | Palmert | G06F 17/30867 707/749 |

* cited by examiner

RANKING AND FILTERING GROUPS RECOMMENDATIONS

TECHNICAL FIELD

This disclosure generally relates to presentation of content in an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a social-networking system may comprise user groups which comprise one or more users of the social-networking system as members of the user group, where the users may share posts within the user group to other members of the user group, and the other members may interact with the shared post, e.g. through a like or comment. In particular embodiments, the social-networking system may suggest a new group for a particular user to join. The social-networking system may recommend groups which will be relevant to the particular user such that the particular user is likely to interact with the group in the future.

In particular embodiments, the social-networking system may determine for each user of the social-networking system a pool of good groups which may be recommended to the user. The social-networking system may start with a superset of groups comprising all groups in the social-networking system, then use a set of filter criteria to exclude groups that are likely to be of less interest to the user. The filter criteria may be based on information about the particular group, or information about the particular user in reference to the particular group. After applying the filter criteria, the social-networking system will determine a set of groups which may be eligible to be recommended to the particular user.

In particular embodiments, the social-networking system may use a number of recommendation sources to submit a subset of suitable candidate groups to be recommended to the particular user. Each recommendation source may independently select candidate groups drawn from the set of groups. Each recommendation source may select candidate groups that are likely to be of interest to the particular user. For example, recommendation sources may select groups that the particular user's friends have joined; groups joined by users who are also members of a group the particular user is already in; groups joined by users living in the same location and about the same age as the particular user; groups joined by users having similar profile information as the particular user; groups relating to topics known to be of interest to the particular user; groups having a co-interaction association with a group or page that the particular user is associated with; or groups the particular user has viewed but not joined. The social-networking system may receive subsets of candidate groups from each recommendation source used, and compile the candidate groups into a single recommendation list.

In particular embodiments, the social-networking system may rank the candidate groups in the recommendation list. The social-networking system may rank the candidate groups based on a social affinity or coefficient of each candidate group with respect to the particular user. The social-networking system may generate one or more feature scores for each candidate group, where each feature score is based on a particular feature of the candidate group. The feature scores may be based on the filtering criteria and recommendation sources used above to select the candidate group. The social-networking system may determine a total score for each candidate group based on the component feature scores, and rank the candidate groups according to the score. In particular embodiments, the social-networking system may use a machine-learned method to adjust the determination of a total score based on a current scoring model and responses from the users receiving recommended groups.

DESCRIPTION OF EXAMPLE EMBODIMENTS

Figure 1:
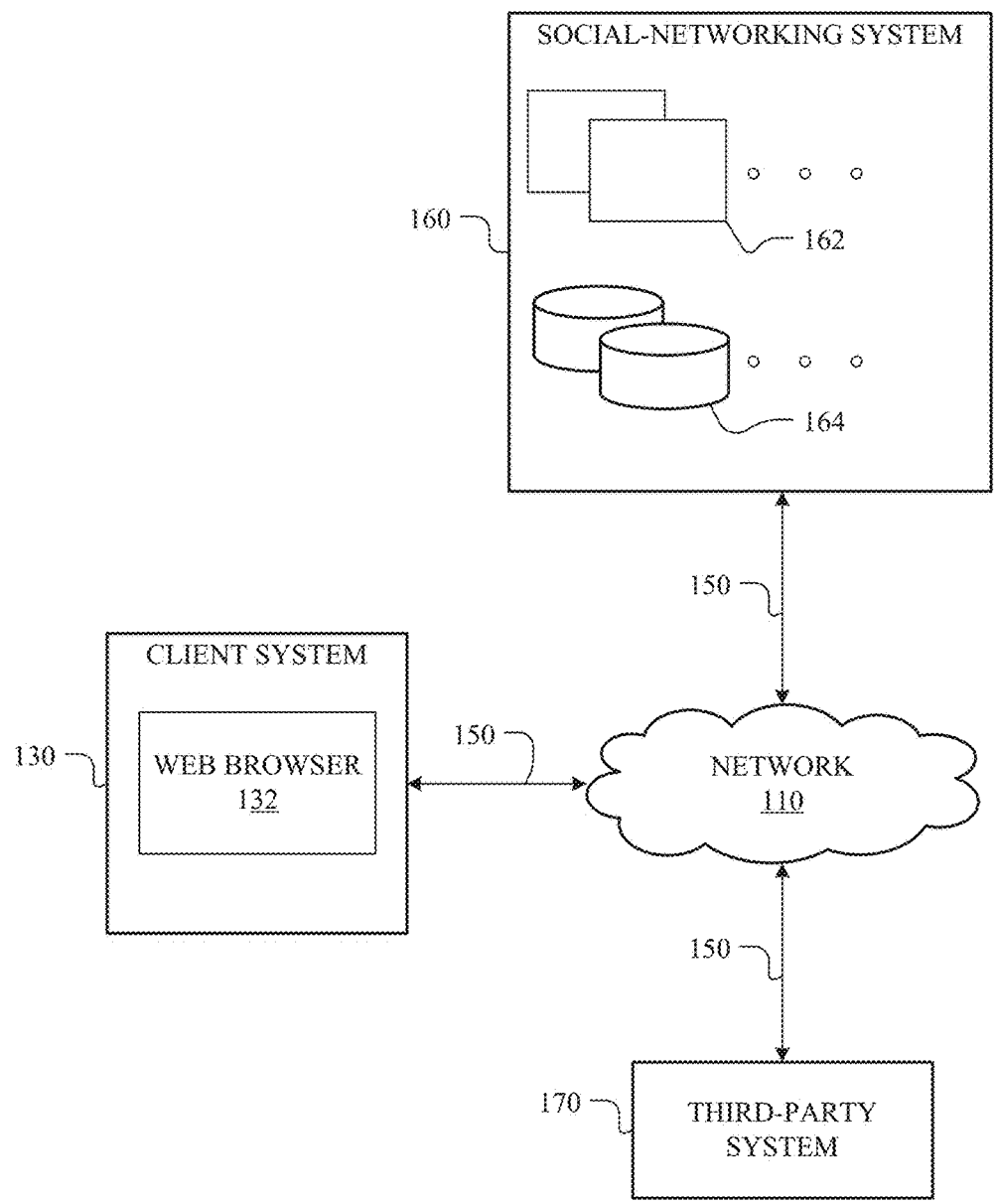
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
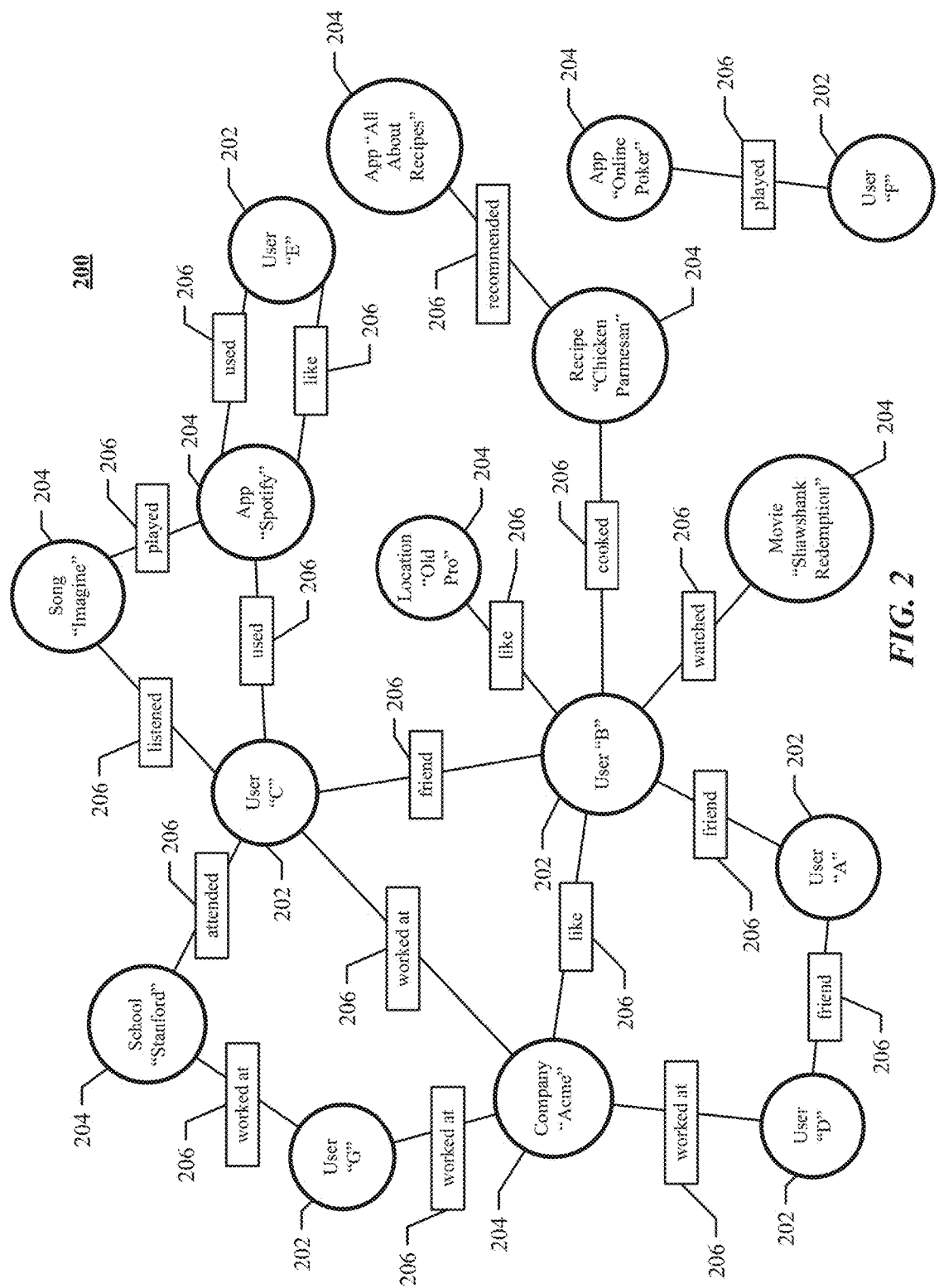
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may recommend one or more groups for a user of social-networking system 160 to join. Recommending groups to the user may enhance the user's experience on social-networking system 160, as the user will be directed to groups comprising other users that the user is interested in, or groups that are related to topics of interest to the user. By recommending interesting groups to the user, social-networking system 160 may increase the user's activities on social-networking system 160.

In particular embodiments, social-networking system 160 may determine a first subset of groups, or a groups inventory, which comprises all groups that social-networking system 160 determines may be recommended to a first user of social-networking system 160. In particular embodiments, social-networking system 160 may ignore groups that are not in the groups inventory when recommending groups as described below. Social-networking system 160 may then select one or more groups from the groups inventory that are determined to be of interest to the first user by one or more recommendation sources. As an example and not by way of limitation, social-networking system 160 may determine that there are 10,000 groups that exist on the social-graph 200 of social-networking system 160 that are eligible to be recommended to the first user. However, since presenting so many groups to a user may not be practical (e.g. the first user is unlikely to scroll through all of the groups), social-networking system 160 may use one or more recommendation sources to select groups that are candidates for recommendation, compile the groups submitted by each source into a recommendation list, and rank the list of groups. In this example, social-networking system 160 may use ten recommendation sources each submitting ten groups to select 100 groups out of the original 10,000, rank the list of 100 groups, and only present the top ten ranked recommendations to the first user. In particular embodiments, the first user may have the option to view the next set of recommended groups after the first ten. In particular embodiments, multiple sources may have submitted the same group for recommendation. Social-networking system 160 may de-duplicate the duplicate submissions. In particular embodiments, social-networking system 160 may also increase the ranking for that group.

In particular embodiments, social-networking system 160 may create a groups inventory comprising all groups of social-networking system 160 that meet a set of group-specific criteria. As an example and not by way of limitation, social-networking system 160 may apply a set of five filtering criteria to each group in the groups inventory, and exclude any groups that fail at least two of the five filtering criteria. The groups inventory would then comprise only groups which meet at least two of the filtering criteria used. In particular embodiments, social-networking system 160 may exclude all groups that fail to meet at least two of the filtering criteria. In particular embodiments, social-networking system 160 may also apply user-specific criteria to the group to further exclude groups from the groups inventory.

In particular embodiments, group-specific filtering criteria may comprise identifying groups that have not had any activity for a particular period of time. As an example and not by way of limitation, social-networking system 160 may determine groups which have not had any posts, likes, comments, or any other interactions within the past 56 days has failed this filter criteria. In particular embodiments, the activity requirement may be a particular number of actions per period of time. As an example and not by way of limitation, social-networking system 160 may determine that a group with fewer than two posts, likes, comments, or other interactions in the past 56 days has failed this filter criteria. In particular embodiments, social-networking system 160 may use filtering criteria comprising a write-active requirement. As an example and not by way of limitation, social-networking system 160 may fail groups that have not had a new post within the past 7 days.

In particular embodiments, social-networking system 160 may use filtering criteria comprising a membership requirement in terms of the total number of members in the group. As an example and not by way of limitation, social-networking system 160 may fail groups that have fewer than 10 members. Social-networking system 160 may use the membership count as a basis for how popular a certain group is, and determine that the particular user would not be interested in very small groups that she already doesn't know about. In particular embodiments, social-networking system 160 may consider the number of members of the group who have been active within a particular time period. As an example and not by way of limitation, social-networking system 160 may use a filter criteria that requires that ten members have interacted with the group in some way (e.g. via a post, like, re-share, or comment) in the past 56 days. If a particular group has 200 members, but only five of those members have interacted with the particular group in the past 56 days, then social-networking system 160 would determine that the group has failed this criteria. Social-networking system 160 may determine that if a group fails this filter criteria, then that there are very few active members of the group.

In particular embodiments, social-networking system 160 may use a filter criteria which requires an average number of feedback activity per post. As an example and not by way of limitation, social-networking system 160 may require that for every post in a group, there must be at least two responsive feedback activities by other members of the group, such as likes, comments, re-shares, etc. If the group's posts have little to no feedback, social-networking system 160 may consider that a sign that the group members are not actually viewing the posts other members are posting in the group, and therefore if the particular user was recommended this group, joined the group, and subsequently posted on the group, the post would receive little to no feedback and the particular user would have a less enjoyable experience posting to that group.

In particular embodiments, social-networking system 160 may apply a group-specific filtering criteria based on the membership type of a particular group. A group may have open, closed, or secret membership; or the group may also be disabled or empty. An open group may be a group where non-member users of social-networking system 160 may still view the group's information, including any content posted to the group, as well as view the membership list of the group. In a closed group, a non-member may be able to view the membership list, but may be barred from viewing any posted content until the non-member becomes a member of the group. In a secret group, a non-member may be unable to view the group's content, the group's membership list, and generally any information regarding the group. In a secret group, a non-member may only gain access to the group's information by invite from a member. An empty group may be a group with no current members. A disabled group may be a group that has been administratively disabled for any reason by social-networking system 160. In particular embodiments, social-networking system 160 may fail groups that are secret, empty, or disabled, and pass open and closed groups.

In particular embodiments, social-networking system 160 may also apply user-specific criteria when generating the groups inventory. As an example and not by way of limitation, social-networking system 160 may simply exclude all groups that the particular user is already a member in from the groups inventory. This criteria may be entirely dependent on the groups the user is in, and therefore this step may change based on the actions of the particular user. As an example and not by way of limitation, if the particular user joins a group that was previously in the groups inventory, social-networking system 160 may in response remove that group from the groups inventory.

Figure 3:
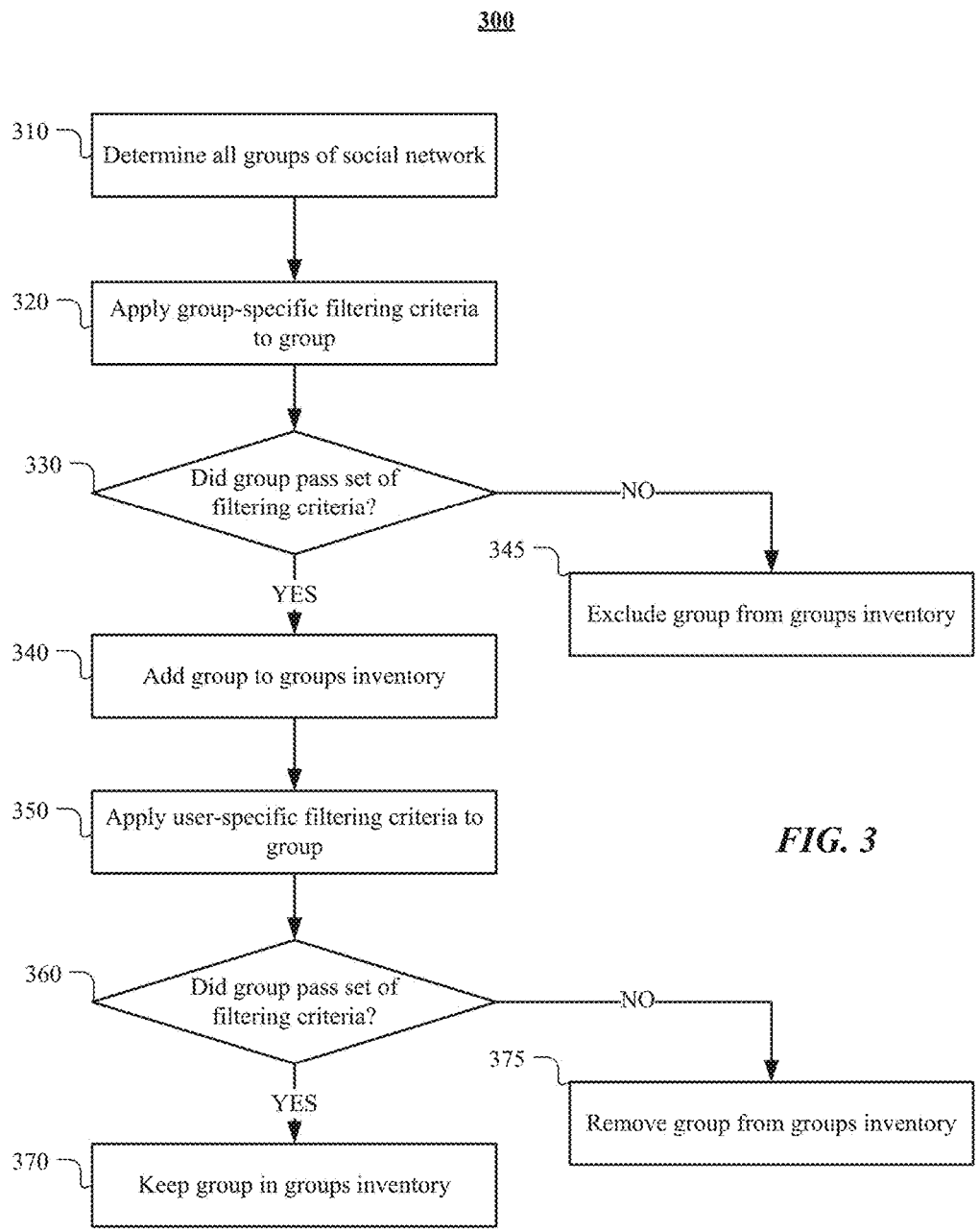
FIG. 3 illustrates an example method of determining a groups inventory using a set of filter criteria.

FIG. 3 illustrates an example method of generating a subset of groups in a groups inventory to be considered for recommendation purposes for a particular user of social-networking system 160. At step 310, social-networking system 160 may determine all current groups in social-networking system 160. At step 320, social-networking system 160 may apply a set of one or more group-specific filtering criteria to each group, for example the filtering criteria discussed above. At step 330, social-networking system 160 may determine if the group has passed the set of filtering criteria. In particular embodiments, a group may pass the set by passing a subset of criteria. In particular embodiments, a group may fail the set of criteria by failing just one of the filtering criteria. If the group has not passed the set of filtering criteria, at step 345, the group is excluded from the groups inventory. If the group has passed, then at step 340, the group is added to the groups inventory. At step 350, social-networking system 160 may apply a set of one or more user-specific filtering criteria. At 360, social-networking system 160 may determine if the group has passed the set of user-specific filtering criteria. The determination may be made based on whether the group has passed a subset of criteria, or whether the group has passed all required criteria in the set of filtering criteria. If the group has not passed this set of user-specific filtering criteria, at step 375 the group is removed from the groups inventory. If the group has passed the set of user-specific filtering criteria, then at step 370, social-networking system 160 determines that the group should remain in the groups inventory.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In particular embodiments, social-networking system 160 may use additional filters to exclude groups from the groups inventory. In particular embodiments, the additional filtering criteria may be applied after the groups have passed the initial requirement of meeting the inventory criteria. These additional filtering criteria may be group-specific or user-specific. As an example and not by way of limitation, social-networking system 160 may use a user-specific language filter based on the language used in posts and comments in the group. Social-networking system 160 may determine one or more languages being primarily used by members of the group in posts and comments, and compare that language with languages determined to be known to the particular user. For example, a particular group may have posts and comments primarily in French. Social-networking system 160 may determine that the particular user is located in a French-speaking region, or social-networking system 160 may have determined that the particular user also posts and comments in French, or has otherwise indicated to social-networking system 160 that he knows French. In this case, social-networking system 160 may determine that the group should not be excluded. In another example, a particular user may reside in a primarily English-speaking location, post and comment exclusively in English on social-networking system 160, and make no other indication that he speaks French. In this example, social-networking system 160 may determine that the French-using group should be excluded from the groups inventory.

In particular embodiments, social-networking system 160 may also determine a location, age, or gender cluster based on the information known about the members of a particular group, and apply a user-specific filtering criteria on any clusters that exist. Social-networking system 160 may determine that if the majority of the members of a particular group are in a particular location, are in a particular age range, or are one gender, then if the particular user is not in that particular location, particular age range, or are of that gender, then this particular group may be of less interest to the user. The age and gender information for the particular user may be provided to social-networking system 160 by the user when creating their profile on social-networking system 160. Location of the user may be provided by the user, may be determined by social-networking system 160 based on activities of the user on social-networking system 160 (such as check-in activities), or by any other information provided to social-networking system 160 about the particular user. This invention contemplates detecting a user's location in any suitable manner.

In particular embodiments, if the location, age, or gender of the particular user is not known to social-networking system 160, social-networking system 160 may ignore the filtering criteria based on that information. As an example and not by way of limitation, if the location of the user is unknown, social-networking system 160 may ignore the results of the location cluster filtering criteria. If the location, age, or gender of the particular user is known, social-networking system 160 may then look at the location, age, and gender distribution of members of a particular group, and determine any clusters that exist. Social-networking system 160 may determine a cluster exists when a certain percentage (e.g. 75%) of members are within a threshold range for location and age, or are one gender. In particular embodiments, social-networking system 160 may create location and age clusters by determining the smallest circle surrounding the locations of at least 75% of the members' locations, or encompassing the ages of at least 75% of the members' ages. As an example and not by way of limitation, if a particular group has 100 members, eighty of whom reside in San Francisco, Calif., ninety of whom are between the ages of 22-24, and seventy-five are female, social-networking system 160 may draw a circle around 75% of the members' locations to determine that there is a location cluster for San Francisco. Social-networking system 160 may draw a circle around the age distribution of 75% of its members to determine that there is an age cluster for 22-24. Social-networking system 160 may also determine that there is a gender cluster for female in this group. In this example, if the particular user resides in Los Angeles, Calif., is age 26, and is male, then social-networking system 160 may use any of the three cluster filters to determine that this group should be excluded from the groups inventory. In particular embodiments, failing any of the filtering criteria may result in the group being excluded. In particular embodiments, social-networking system 160 may determine that if the group fails one of the criteria but passes the others, the group may still be included in the groups inventory. As an example and not by way of limitation, if the user in the above scenario lives in San Francisco, is age 28, and female, social-networking system 160 may determine that failing the age cluster criteria is not enough to exclude this group given that the group passed with respect to the location and gender criteria.

In particular embodiments, if there is no defined cluster of members, social-networking system 160 may ignore that filtering criteria as applied to that particular group. As an example and not by way of limitation, if a group has 100 members, forty reside in New York City, thirty reside in Menlo Park, Calif., and the remainder are scattered over the United States, social-networking system 160 may determine that there is no location cluster, and thus may determine that the location criteria will not be applied to the group. In particular embodiments, the social-networking system 160 may not have location information for one or more members of the group. Social-networking system 160 may determine a cluster exists based only on the members for which location information is known. In particular embodiments, if a threshold percentage of members do not have location information, social-networking system 160 may determine that no cluster can exist, and determine that the location cluster filter should not be used.

Figure 4:
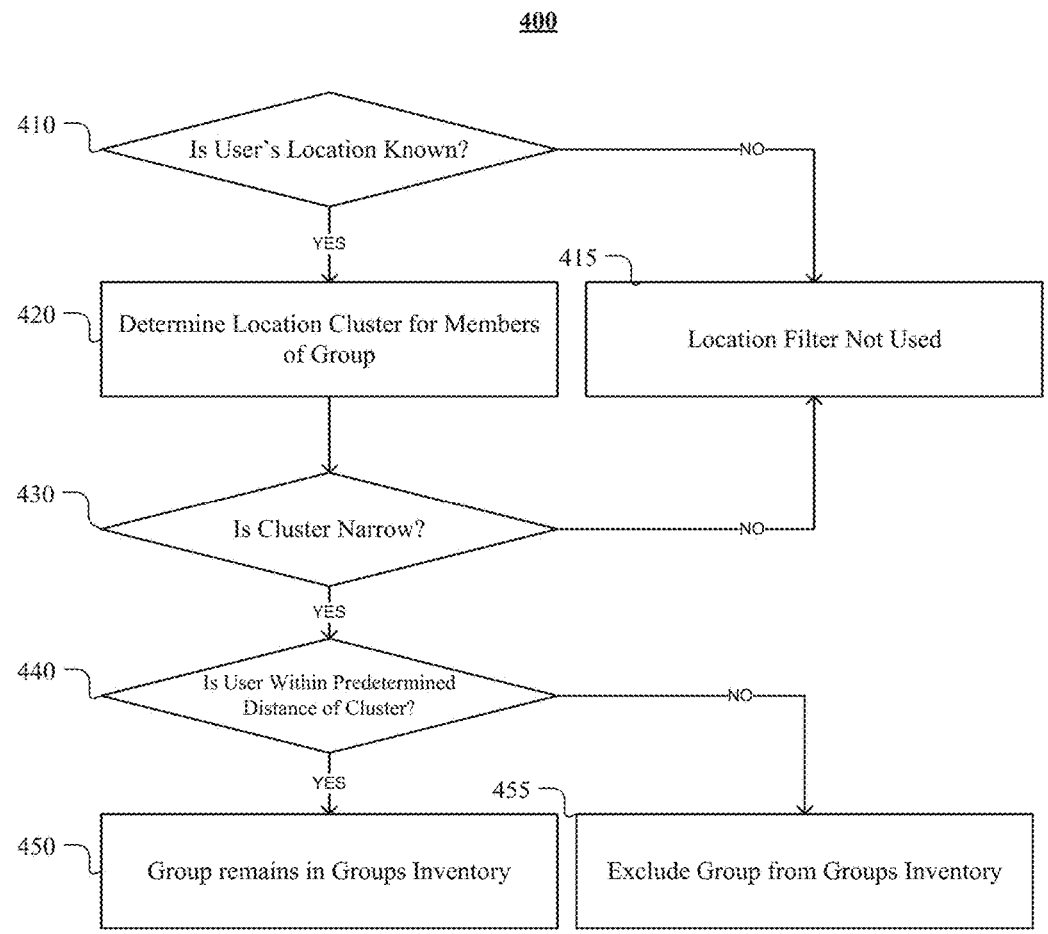
FIG. 4 illustrates an example method of filtering groups from the groups inventory based on a location cluster associated with a group.

FIG. 4 illustrates an example method of determining whether a group passes the location cluster filtering criteria as described above. At step 410, social-networking system 160 may first determine if the particular user's location is known to social-networking system 160. If the location is unknown, then this filtering criteria will not be applicable, and at step 415 the location filter will not be used. If the location of the particular user is known, at step 420, social-networking system 160 will determine if a location cluster exists for the members of the group. In particular embodiments, social-networking system 160 may define a cluster as the smallest circle surrounding the locations of at least 75% of the members of the group. At step 430, social-networking system 160 may determine if the cluster is narrow. Social-networking system 160 may use a geographic diameter of the circle to determine if it is narrow, or determine if 75% of the users can be placed in a discrete geographic location (e.g. a city or county). If the cluster is not narrow, then at step 415 social-networking system 160 may determine that the location filter should not be used. If there is a narrow cluster for location, then at step 440, social-networking system 160 will determine if the particular user's location is within a pre-determined threshold distance of the location cluster. As an example and not by way of limitation, if the cluster is defined as the boundaries of San Francisco, Calif., then a particular user living in San Francisco or within two miles of the city limits may be considered to be within the cluster. If the particular user is within the cluster, at step 450 the group will remain in the groups inventory. However, if the user is outside the location cluster, then at step 455 the group will be excluded from the groups inventory.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

In particular embodiments, social-networking system 160 may use a user-specific filter criteria which determines if the particular user has previously left a group or been banned from the group. If a particular user previously left a group, or was banned from the group, social-networking system 160 may determine that the particular user is already aware of the group, and is either uninterested in re-joining the group, or will be barred from re-joining Therefore, social-networking system 160 may exclude such a group from the groups inventory.

In particular embodiments, social-networking system 160 may apply a group-specific filtering criteria to exclude groups that contain bad or obscene language in the title of the group or in the group description. Social-networking system 160 may determine that particular users may object to or be offended by receiving group recommendations that contain bad or obscene language, and exclude such groups from the groups inventory.

In particular embodiments, social-networking system 160 may apply group-specific filtering criteria based on x'ed-out recommendations for the particular group. If a particular group has been recommended to other users in the past, but those other users have largely ignored the recommendation or affirmatively closed the display of the particular group ("x'ing-out" the recommendation), social-networking system 160 may determine that the particular user may also be uninterested in the recommendation and will likely ignore it, and thus exclude the group from the groups inventory. In particular embodiments, social-networking system 160 may consider the number of x'ed-out recommendations overall for the group, the overall rate at which other users have x'ed-out recommendations for the group, total number of x'ed-out recommendations over a particular period of time, or the rate of x'ed-out recommendations over a particular period of time. As an example and not by way of limitation, a particular group may have been previously recommended to users 200 times over the past 30 days, with 120 users ignoring or x'ing-out the recommendation, and 80 users subsequently viewing or joining the group. Social-networking system 160 may use a filter criteria which considers the total number of x'ed-out recommendations over the past 30 days (in this instance, 120 total), and exclude the group from the groups inventory if the number exceeds a threshold number of x'ed-out recommendations. In particular embodiments, social-networking system 160 may determine the rate at which recommendations have been x'ed-out over the last 30 days (in this instance, 60% x'ing-out rate), and if the rate exceeds a threshold rate, determine that the group should be excluded from the groups inventory.

In particular embodiments, social-networking system 160 may apply a set of admin-approval criteria to determine if the group should be excluded from the groups inventory. Ensuring that the administrative functions of the group are being performed may prevent users from being recommended groups which are poorly-run and for which the user will not have a good group experience. Applying admin-approval criteria may also prevent group administrators from being overwhelmed at once with a large number of outstanding administrative functions. As an example and not by way of limitation, social-networking system 160 may determine a total number of users of social-networking system 160 who have requested to be added as members to the group and are pending administrative approval. A long queue to be admitted may indicate either that the administrator(s) are overwhelmed by a large number of membership requests, or that the administrator(s) have not accepted new members in some time. In either event, recommending the group to the particular user would not be productive since the user will not be able to join the group anytime soon. In particular embodiments, social-networking system 160 may exclude groups that have a high rejection rate of new members who have requested membership. Social-networking system 160 may determine that the administrators have not been happy with the new pending members and are turning many requests down, indicating that even if the particular user were recommended this group and attempted to join, there is a strong likelihood that the particular user would also be rejected from membership. In particular embodiments, social-networking system 160 may stop recommending groups to a particular user if that particular user has a large number of outstanding group join requests. This may indicate to social-networking system 160 that the user is a spam user, and having the particular user join a particular group may not be in the interest of the group.

In particular embodiments, social-networking system 160 may use a weak AND function for the filtering criteria, such that if a particular group narrowly fails to meet one or more required criteria, but the particular group strongly correlates to other criteria, then social-networking system 160 may still determine that the particular group should not be excluded. As an example and not by way of limitation, if a particular group fails the age cluster criteria discussed above, but strongly passes the location cluster criteria and the other criteria discussed above, social-networking system 160 may determine that it is still a viable candidate group to be recommended. A more detailed description of the use the weak AND (WAND) and strong OR (SOR) operators as weighted search constraints is found in U.S. patent application Ser. No. 13/560,901, filed 27 Jul. 2012, which is incorporated by reference.

In particular embodiments, social-networking system 160 may use one or more candidate recommendation sources to generate a subset of candidate groups to be recommended to a particular user, based on the groups inventory for the particular user which was determined by the methods discussed above. A candidate recommendation source may be a particular algorithm or process that, when executed by social-networking system 160, submits a subset of candidate groups to social-networking system 160 to be recommended for a particular user. Social-networking system 160 may use a number of candidate recommendation sources, each of which will independently submit a number of candidate groups drawn from the groups inventory. In particular embodiments, social-networking system 160 may accept an equal number of candidate groups from each candidate recommendation source. In particular embodiments, social-networking system 160 may weight the candidate recommendation sources such that some sources may submit more candidate groups than other sources. In particular embodiments, the subset of candidate groups submitted by each candidate recommendation source may overlap. As an example and not by way of limitation, two candidate recommendation sources may each submit a subset of ten candidate groups, where two of the ten in each subset are identical and the other eight are different for each subset. In particular embodiments, social-networking system 160 may de-duplicate the identical groups, and combine the two subsets into a list of eighteen candidate groups. In particular embodiments, social-networking system 160 may subsequently request two additional candidate groups from one or both candidate recommendation sources to make up for the two empty group slots. In particular embodiments, social-networking system 160 may proceed with the smaller list of candidate groups.

In particular embodiments, social-networking system 160 may request a new subset of candidate groups from each candidate recommendation source periodically, or in response to the actions of the particular user on social-networking system 160. As an example and not by way of limitation, social-networking system 160 may request an update of candidate groups from all candidate recommendation sources when the particular user joins a group, leaves a group, views a group or page, updates their profile information, updates their location to social-networking system 160, adds a friend on social-networking system 160, or un-friends another user on social-networking system 160. In particular embodiments, social-networking system 160 may respond to the actions of a particular user on social-networking system 160 by requesting updates only from candidate recommendation sources that reference the user's action. As an example and not by way of limitation, if social-networking system 160 uses a Friends source, discussed in detail below, which considers friends of the particular user on social-networking system 160, then in response to the particular user adding a new friend on social-networking system 160, social-networking system 160 may request an update of candidate groups only from the Friends source.

In particular embodiments, social-networking system 160 may use a Friends source as a candidate recommendation source to determine a subset of candidate groups to be recommended to a particular user. As an example and not by way of limitation, the Friends source may determine all other users who are friends of the particular user on social-networking system 160. In particular embodiments, the Friends source may then examine the membership lists of each group in the groups inventory, and determine if any of the particular user's friends are members of a particular candidate group. The Friends source may then determine a subset of candidate groups, wherein each candidate group in the subset has at least one friend of the particular user as a member. In particular embodiments, social-networking system 160 may also consider the time when a friend of the particular user joined a particular candidate group, and only include in the subset those candidate groups that had a friend join recently, e.g. within the past 60 days.

In particular embodiments, social-networking system 160 may determine how many candidate groups comprise the subset submitted by the Friends source, and compare that number to the number of candidate groups the Friends source should be sending for the particular user. As an example and not by way of limitation, social-networking system 160 may have determined that the Friends source should submit ten candidate groups to be added to the recommendation list. Social-networking system 160 may determine that the Friends source has submitted too many candidate groups, or too few. If there are too many candidate groups, social-networking system 160 may filter out one or more candidate groups by excluding the candidate groups with the fewest total friends as members. As an example and not by way of limitation, if the Friends source submits twelve candidate groups but the social-networking system 160 only requires ten, social-networking system 160 may count the number of friends in each of the twelve groups, and exclude the two groups with the fewest friends.

In particular embodiments, social-networking system 160 may consider the social affinity of the friends in each group to the particular user. In this embodiment, groups with close friends of the particular user may be ranked above groups with more friends (but distant friends) of the particular user. In particular embodiments, if the Friends source submits too few candidate groups, social-networking system 160 may expand the scope of the Friends source to also consider groups joined by friends of friends of the particular user on social-networking system 160. The Friends source would then operate in similar fashion as described above, but would consider the friends of friends as "friends" of the user for ranking based on total number of "friends" in each candidate group, or for determining the social affinity of the "friends" in each candidate group with respect to the particular user. In particular embodiments, social affinity of the friends who are members in a plurality of candidate groups may be determined to be a tiebreaking factor when eliminating one or more of the candidate groups from the subset. As an example and not by way of limitation, the Friends source may submit twelve candidate groups where only ten are needed, requiring two of the candidate groups to be excluded. Social-networking system 160 may determine that three of the twelve candidate groups have only one friend of the particular user as a member. If all three are excluded, then the Friends source only has nine candidate groups, one less than required. Social-networking system 160 may then look at the social affinity of each friend in each of the three groups, and exclude the two groups that have a friend-member with lower social affinity with respect to the particular user.

In particular embodiments, the Friends source may also weight friends having the same location as the particular user (e.g. same current area of residence) or same hometown higher than other friends. In particular embodiments, the Friends source may also weight more heavily friends whose actions have had the greatest impact on the particular user's group joins. As an example and not by way of limitation, user A may have friends user B and user C. User B may be a member of groups G, H, I, J, K, and L, while user C is a member of groups L, M, N, O, and P. Based on previous recommendations made to user A, user A has joined groups G, H, and L. Based on user A's group joins, the Friends source may determine that user A is more strongly influenced by the groups that user B has joined over the groups user C has joined. As a result, when the Friends source determine a subset of candidate groups to recommend to user A, groups I, J, and K may be ranked ahead of groups M, N, O, and P.

Figure 5:
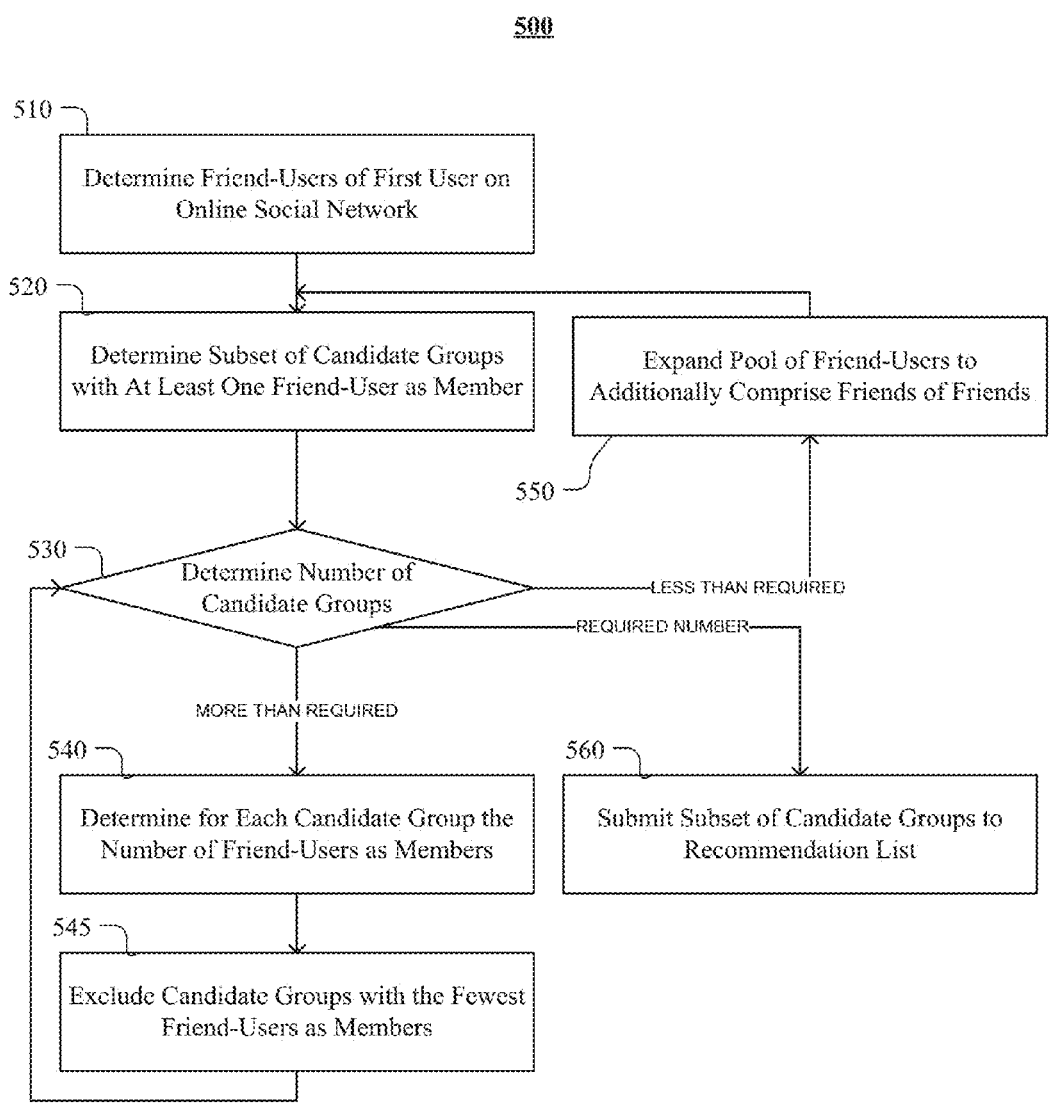
FIG. 5 illustrates an example method of a candidate recommendation source determining a candidate group for a user based on friends of the user.

FIG. 5 illustrates an example method for determining candidate groups for a particular user using a Friends source on social-networking system 160. At step 510, social-networking system 160 may determine one or more other users of social-networking system 160 who are friends of the particular user. At step 520, the Friends source may determine a subset of candidate groups from the groups inventory for the particular user, wherein each candidate group in the subset has one or more friends of the particular user as a member of the candidate group. At step 530, social-networking system 160 may determine the number of candidate groups in the subset determined by the Friends source, and may compare that number of candidate groups to the expected number of candidate groups for the Friends source as determined by social-networking system 160. If the subset contains exactly the expected number of candidate groups, then at step 560 the subset of candidate groups may be sent to the social-networking system 160 to be combined into a recommendation list. If the subset contains more candidate groups than required, at step 540 the Friends source or social-networking system 160 may count the number of friends in each of the candidate groups. At step 545, the Friends source may exclude the candidate groups with the lowest number of friends as members, and return to step 530 to determine if there are now the required number of candidate groups. If there are still too many, the Friends source may return to step 540 and step 545. If there are fewer candidate groups than the required number, at step 550 the Friends source may also take into consideration friends of friends of the particular user, and return to step 520 to determine a subset of candidate groups with at least one friend or one friend of a friend as a member.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

In particular embodiments, social-networking system 160 may use a Co-member source as a candidate recommendation source to determine a subset of candidate groups to be recommended to a particular user. The Co-member source may operate similarly to the Friends source, wherein the Co-member source determines all users that have a common group with the particular user, and determines if any of these co-members are also members of any group from the groups inventory. This allows social-networking system 160 to consider groups joined by members of the same groups as the particular user, or groups joined by users who are fans of the same page as the particular user. As an example and not by way of limitation, the particular user may already be a member of group A. The Co-member source may determine the other members of group A and determine if any of those other members are also members in a group in the groups inventory. If there is a co-member who is also a member of a particular group, that particular group may be added to the subset of candidate groups for the Co-member source. Similar to the Friends source, if there are too many candidate groups in the subset, the Co-member source may eliminate the groups with the fewest co-members in the group. In particular embodiments, if there are too few candidate groups, the Co-member source may expand to another degree of connection, to look at members of groups that the co-members also belong to, e.g. a co-member of a co-member. As another example and not by way of limitation, a particular user may be a fan of page B on social-networking system 160. The Co-member source may consider what groups have been joined by other fans of page B, and submit any of those groups in the groups inventory as candidate groups to the recommendation list. In particular embodiments, social-networking system 160 may also look at groups joined by other users of social-networking system 160 who have indicated an interest in a topic in common with the particular user.

In particular embodiments, social-networking system 160 may use a City and Age source as a candidate recommendation source to determine a subset of candidate groups to be recommended to a particular user. As an example and not by way of limitation, the City and Age source may take the city in which the particular user resides, and an age range which the particular user is in, determine one or more other users of social-networking system 160 with matching location and age, and determine one or more candidate groups that those other users are also in. As an example and not by way of limitation, a particular user may be residing in Chicago, Ill., and be aged 29 years old. The City and Age source may determine a set of one or more other users who also reside in Chicago, Ill., and are aged 28-30. The City and Age source may then determine other groups joined by the set of other users, and present those groups as candidate groups. Similarly to the location and age filter criteria, the age and location may be provided to social-networking system 160 by the user. Social-networking system 160 may determine the location of a particular user in any suitable manner. If social-networking system 160 does not have either the location or age information of the particular user, social-networking system 160 may ignore any candidate groups submitted by this candidate recommendation source.

In particular embodiments, if the City and Age source submits too many candidate groups, social-networking system 160 may narrow the parameters of the City and Age source. As an example and not by way of limitation, if the City and Age source initially specified a location of San Francisco and an age range of 22-26, and the City and Age source submitted too many candidate groups as a result, the City and Age source may narrow the parameters to a location of the SoMa neighborhood of San Francisco, or an age range of 22-24, and determine a subset of candidate groups based on the new parameters. In particular embodiments, if the City and Age source initially submits too few candidate groups, then the parameters may be widened further. In the example above, the location parameter may be expanded to cover the Bay Area, or the age range may be expanded to ages 21-28. Social-networking system 160

Figure 6:
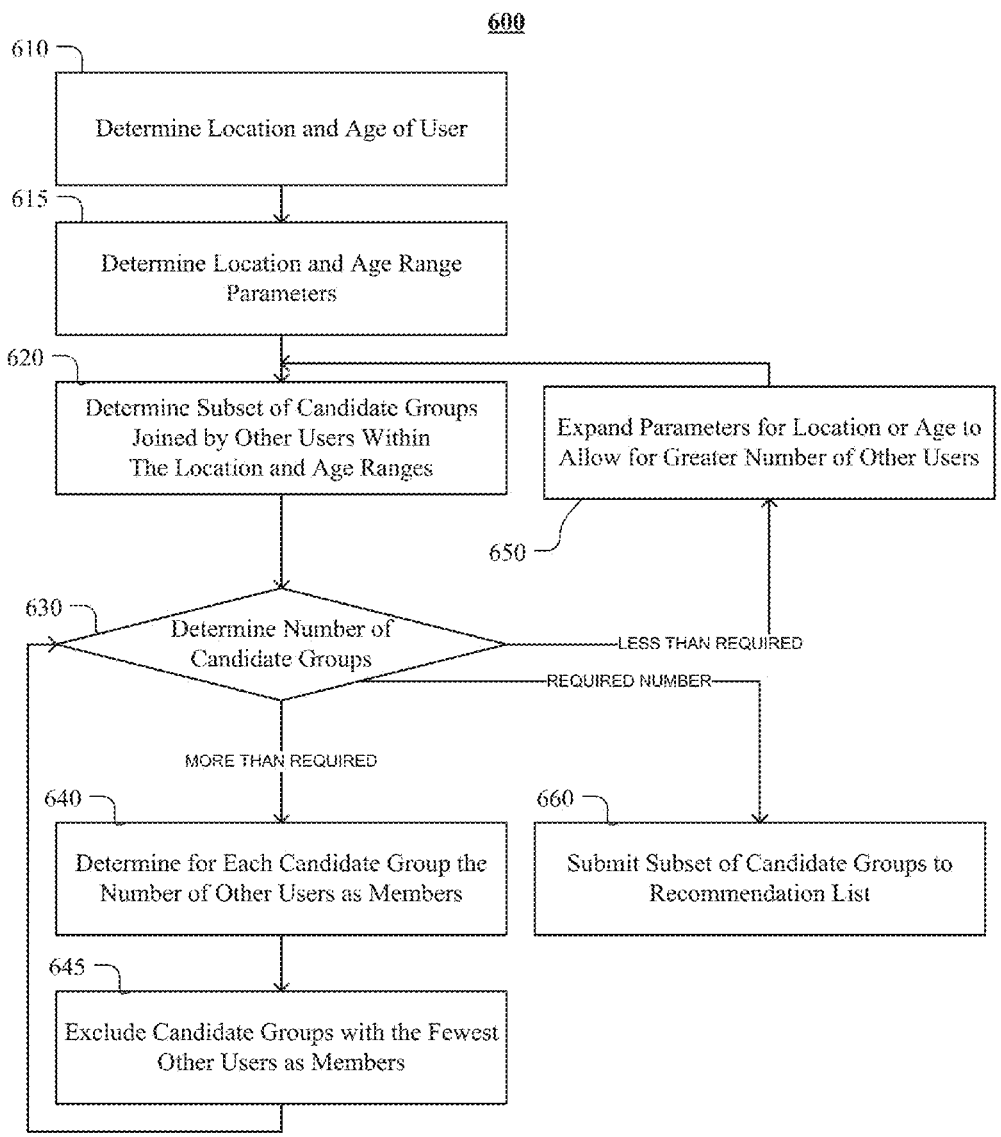
FIG. 6 illustrates an example method of a candidate recommendation source determining a candidate group for a user based on the location and age of the user.

FIG. 6 illustrates an example method of using the City and Age source to determine a subset of candidate groups for a particular user. At step 610, the City and Age source may determine the location and age of the particular user. If the location or age of the particular user is not known to social-networking system 160, social-networking system 160 may ignore the City and Age source. At step 615, the City and Age source may determine a location and age range based on the location and age of the particular user. In particular embodiments, social-networking system 160 may have a default set of location and range parameters to use as a first set of parameters for the City and Age source. In particular embodiments, the City and Age source may tailor the initial set of parameters based on previous parameters used for the particular user. At step 620, social-networking system 160 may determine a subset of one or more candidate groups, wherein the candidate groups are groups in the groups inventory, and each candidate group comprises one or more members having location and age information within the defined location and age parameters. At step 630, the City and Age source may determine the number of candidate groups in the subset. In particular embodiments, the City and Age source may stop adding new candidate groups to the subset when a threshold number of candidate groups are added. If the subset contains the required number of candidate groups, at step 660, the subset of candidate groups may be submitted to the recommendation list. If there are more candidate groups than the required number, at step 640 the number of members having location and age information within the location and age range is determined for each candidate group. At step 645, the candidate groups having the fewest members with location and age matching the range are excluded, and the process may return to step 630 to determine the new number of candidate groups. If there are too few candidate groups, then at step 650, the location or age range parameters may be expanded to cover users living farther away or in a greater age range. The process may then return to step 620 to determine a new subset of candidate groups based on the expanded location or age ranges.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

In particular embodiments, social-networking system 160 may use a Profile source as a candidate recommendation source to determine a subset of candidate groups to be recommended to a particular user. The Profile source may consider any profile information shared by the particular user about himself on social-networking system 160, and determine one or more other users who share those traits. As an example and not by way of limitation, a particular user may have input information on his profile relating to his workplace, his education, hobbies, recent events, hometown, etc. The Profile source may determine other users of social-networking system 160 who have worked at the same placed, attended the same school, have the same hobbies, were at the same event, are from the same hometown, etc. The Profile source may then determine one or more candidate groups that have one or more of these other users as members in the group, and add those candidate groups to a subset of candidate groups to be recommended to the particular user. As an example and not by way of limitation, user A and user B may have attended the same university C. When determining a subset of candidate groups for user A using a Profile source, the Profile source may note that users A and B attended C, and that B is in a group called "C Alumni Group." The Profile source may then determine that the "C Alumni Group" should be added to the subset of candidate groups to recommend to user A.

In particular embodiments, the Profile source may weight groups comprising members who share more similarities in profile information with the particular user. As an example and not by way of limitation, user A may have a particular workplace, went to a particular college, has a specific hobby, and is from a particular hometown. User B went to the same college as user A, while user C works at the same place, has the same hobby, and is from the same hometown as user A. In this example, the Profile source may weight any groups that user C belongs to more highly than any groups that user B belongs to.

In particular embodiments, the Profile source may consider information inferred about the particular user by social-networking system 160. As an example and not by way of limitation, social-networking system 160 may predict that the particular user is at a specific location at a specific time, e.g. at a particular restaurant every weekend. The Profile source may look for other users of social-networking system 160 who also go to this restaurant frequently or every weekend, determine any candidate groups that those other users are in, and add those candidate groups to the subset.

In particular embodiments, social-networking system 160 may use a Topic-based source as a candidate recommendation source to determine a subset of candidate groups to be recommended to a particular user. Each candidate group may have associated content, such as the content in posts and comments shared in the group. Social-networking system 160 may scrape topics from the posted content by using a "topic tagger", or a text crawler to tag topics to the posted content. As an example and not by way of limitation, if a member of a particular group shares a post to the group with content A, B, and C, social-networking system 160 may scrape the text of the post, and tag the post with topics A1, B1, and C1. If another member comments on the post with content D, social-networking system 160 may subsequently scrape the text of the comment and tag the comment with topic D1. In particular embodiments, social-networking system 160 may associate the topics with the group as well, so that the particular group is also associated with topics A1, B1, C1, and D1. In particular embodiments, the topic tagger may tag topics to the title or description of a particular group. These tags may be considered to be stronger than topic tags for shared posts and comments, since the topics for the title and description may be assumed to be directly on point with any topics for the particular group, while posts or comments may stray from the main purpose of the group.

In particular embodiments, a Topic-based source may compare the topics associated with a particular candidate group with any topics associated with a particular user. If there is a correlation between topics associated with a candidate group and topics associated with the particular user, the Topic-based source may add that candidate group to a subset of candidate groups for recommendation. As an example and not by way of limitation, in the example above, topic A1 may be "ice hockey." The Topic-based source may determine if the particular user has any existing association with the topic "ice hockey." The particular user may have input "ice hockey" as an interest on her profile; may be a fan of an ice hockey team or club page on social-networking system 160; may have shared posts or comments of her own relating to the topic of "ice hockey" (as determined by the topic tagger) or may be in another group associated with "ice hockey." In particular embodiments, the Topic-based source may consider the particular user's interactions with other content on social-networking system 160. As an example and not by way of limitation, in the above example, if the user frequently clicks on content in her newsfeed that is related to "ice hockey," the Topic-based source may also associate the particular user with that topic. In particular embodiments, the Topic-based source may determine that the particular user has stronger or weaker associations with particular topics. In the example above, the Topic-based source may determine that the particular user has a strong interest in "ice hockey" and a weaker interest in "soccer." In this example, the Topic-based source may rank candidate groups relating to the topic "ice hockey" more highly than candidate groups relating to the topic "soccer." If the Topic-based source has submitted too many candidate groups and must exclude a candidate group, the Topic-based source may determine that the "soccer" candidate group should be excluded.

In particular embodiments, the Topic-based source may determine any new or trending topics associated with a candidate group, and determine that a particular user may be interested in any new or trending topics. As an example and not by way of limitation, social-networking system 160 may have information about the particular user indicating that he would like to know what is new or popular in general. In particular embodiments, the Topic-based source may then select candidate groups that are associated with topics determined by social-networking system 160 to be new or "trending" (i.e. sudden increase in popularity), and add those candidate groups to the subset of candidate groups.

In particular embodiments, social-networking system 160 may use a Co-interaction source as a candidate recommendation source to determine a subset of candidate groups to be recommended to a particular user. The Co-interaction source may consider aggregated information about users' behaviors on social-networking system 160 with respect to one or more groups or pages on social-networking system 160, and determine if there are any activity patterns associating two or more groups or pages. In particular embodiments, the Co-interaction source may determine users' activity patterns for all time with respect to a particular group or page. In particular embodiments, the Co-interaction source may determine users' activity patterns within a particular period of time, for example in the last month with respect to a particular group or page. As an example and not by way of limitation, when the Co-interaction source considers page A on social-networking system 160 and the activity patterns of all users who have interacted with page A (e.g. view, comment, post, like, etc.), the Co-interaction source may determine that a significant proportion of users who interact with page A also interact with group B during the same session on social-networking system 160. As an example and not by way of limitation, users interacting with page A may in the same session interact with group B (e.g. via view, post, comment, like, etc.) before interacting with page A, after interacting with page A, or even simultaneously with the interaction with page A. The Co-interaction source may then associate group B with page A as co-interacting, and determine that group B may be a candidate group. In particular embodiments, co-interactions may be group-to-group, i.e. from group B to group C or vice versa. In particular embodiments, the co-interaction may be page-to-group, as seen in the example above with page A and group B. In particular embodiments, the Co-interaction source may determine that there is a co-interaction if a threshold percentage of users interacting with the first group or page also interact with the candidate group. For example, the Co-interaction source may determine that there is a co-interaction between page A and group B if ten percent of users interacting with page A also interact with group B in the same session on social-networking system 160.

In particular embodiments, the Co-interaction source may consider co-interacting groups with respect to groups that the particular user has recently interacted with. In particular embodiments, the Co-interaction source may determine one or more seed groups or pages to determine a subset of candidate groups. The purpose of using seed groups may be to ensure that enough candidate groups are determined by the Co-interaction source to be added to the corresponding subset of candidate groups, and ensure that the candidate groups are still likely to be of interest to the particular user. The Co-interaction source may determine a seed group or page, then determine if there are any co-interacting groups that may be associated with the seed group or page. If there is a co-interacting group, the Co-interaction source may add that group as a candidate group to the subset. If there is no co-interacting group (either because there was no group that was co-interacted with by users of the seed group, or there is a co-interacting group but it is not a group in the groups inventory), then the Co-interaction source may determine another seed group and proceed as described above. In particular embodiments, the Co-interaction source may determine new seed groups and repeat the process until the required number of candidate groups is generated.

In particular embodiments, the Co-interaction source may determine seed groups to be groups that the particular user is already a member in, and has a high affinity to. The affinity of the particular user with respect to a group may be determined by the frequency of the particular user's interactions with the group, affinity to other members in the group, affinity to topics discussed in the group, or any other suitable means of determining a social coefficient or affinity of the particular user with respect to the group. As an example and not by way of limitation, the Co-interaction source may determine that user A posts and comments frequently in group B, and has a high affinity to group B. The Co-interaction source may also determine that there is a co-interaction between group B and group C. If group C is in the groups inventory for user A, the Co-interaction source may then add group C to the subset of candidate groups to be submitted to the recommendation list. In particular embodiments, a seed group may be a group that the particular user has recently viewed. As an example and not by way of limitation, the Co-interaction source may determine that user A recently viewed group B. If the Co-interaction source determines that there is a group C in the groups inventory for user A which is co-interacting with group B, the Co-interaction source may add group C to the subset. In particular embodiments, the Co-interaction source may select as a seed group a random group from the groups that the particular user is already a member of. Using a random group as a seed group may introduce some variability to the subset of candidate groups, while maintaining the likelihood that the particular user will remain interested in the candidate groups (since they co-interact with other groups that the particular user has already joined). In particular embodiments, the Co-interaction source may use as a seed page one or more pages of social-networking system 160 that the user has interacted with the most, e.g. views frequently, comments on, etc. The Co-interaction source may determine that the particular user would be interested in co-interacting groups of a page that the particular user is active on, and would add that group (if it is an eligible group for recommendation) to the subset.

Figure 7:
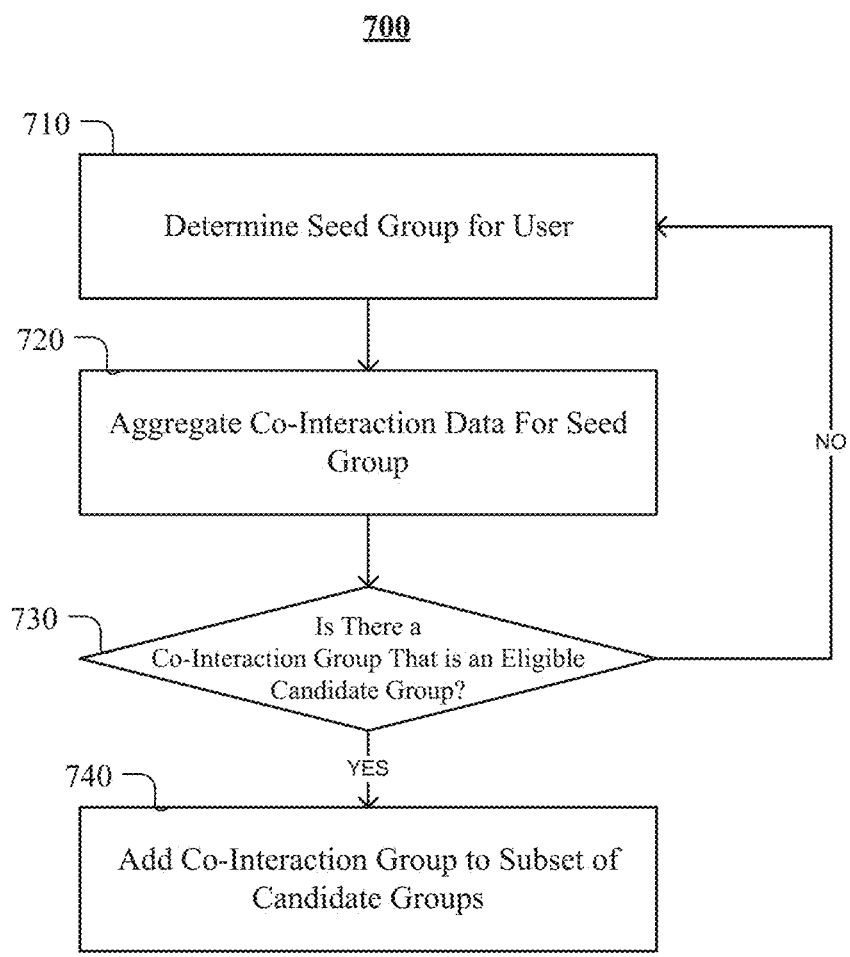
FIG. 7 illustrates an example method of a candidate recommendation source determining a candidate group for a user based on co-interactions with a seed group.

FIG. 7 illustrates an example method of using a Co-interaction source to determine one or more candidate groups to recommend to a particular user, as described above. At step 710, the Co-interaction source may determine a seed group for a user. As discussed above, the seed group may be a group that the user has high affinity to; may be a group that the user has recently viewed; may be a group randomly selected from the groups that the user is a member of; or may be a page that the user has high affinity to. At step 720, the Co-interaction source may aggregate co-interaction data for the determined seed group. As discussed above, the aggregate co-interaction data may determine if there are activity patterns of users interacting with the seed group that associate the seed group with one or more co-interacting groups. A threshold percentage of users may be required to interact with both the seed group and the co-interacting group in the same session before the Co-interaction source considers the two groups to be co-interacting. At step 730, the Co-interaction source may determine if there is a co-interaction group that is also a group found in the groups inventory and is thus an eligible candidate group. If there is no co-interacting group, or if the co-interacting group is not eligible to be a candidate group, then the process may return to step 710, and select a new seed group. If there is a co-interacting candidate group, at 740, the co-interacting group is added as a candidate group to the subset of candidate groups.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

In particular embodiments, social-networking system 160 may use a Non-member source as a candidate recommendation source to determine a subset of candidate groups to be recommended to a particular user. The Non-member source may determine candidate groups to be groups that the particular user has viewed, but not joined. In particular embodiments, the Non-member source may only exclude groups that the user has not viewed in some time, e.g. exclude groups that the user has not viewed in more than three months. In particular embodiments, the Non-member source may only consider groups that are open, i.e. groups that the particular user has viewed and been able to view the content shared in the group. As an example and not by way of limitation, the Non-member source may determine that the user should not be recommended a closed group based on the fact that the user viewed the group—when the user viewed the closed group, she would have been only able to view the membership list of the closed group, and not any of its content. Therefore, it may be more difficult to determine if the user will be interested in the contents of the closed group.

In particular embodiments, social-networking system 160 may combine the subsets of candidate groups submitted by each candidate recommendation source used into a recommendation list of candidate groups. In particular embodiments, as discussed above social-networking system 160 may de-duplicate any identical candidate groups submitted by two or more candidate recommendation sources, and may request additional candidate groups from one or more of the candidate recommendation sources. In particular embodiments, social-networking system 160 may rank the recommendation list of candidate groups before sending the recommendation list to the user. As an example and not by way of limitation, social-networking system 160 may rank the recommendation list so that the candidate groups which the user will most likely interact with (e.g. subsequently join) are presented first to the user. Social-networking system 160 may rank the recommendation list, then only send a top number of ranked candidate groups to the user. As an example and not by way of limitation, if social-networking system 160 used five candidate recommendation sources, each submitting ten candidate groups, social-networking system 160 may have a recommendation list of fifty candidate groups. Social-networking system 160 may then rank the recommendation list, exclude the twenty-five lowest-ranked groups, then present the twenty-five top-ranked groups to the user. In particular embodiments, social-networking system 160 may present the recommendation list to the user such that lower-ranked groups may be viewed by accessing a second page. As an example and not by way of limitation, in the example given above, social-networking system 160 may send the entire recommendation list to the user, but place the lowest-ranked twenty-five groups on a second page if the user wishes to view them.

In particular embodiments, the candidate groups in the recommendation list may be ranked based on a social affinity or coefficient of the candidate group with respect to the particular user. As an example and not by way of limitation, social-networking system 160 may calculate a social affinity or coefficient for each candidate group, which may represent how interested the particular user may be in the group, the members in that group, the topic of the group, etc. Social-networking system 160 may then rank the candidate groups so that the candidate group with the highest social affinity or coefficient with respect to the particular user is presented first, the candidate group with the second-highest affinity or coefficient is presented second, and so on in that manner, with the candidate group with the lowest affinity or coefficient ranked last.

In particular embodiments, social-networking system 160 may rank the candidate groups in the recommendation list based on scores calculated for each group with respect to one or more features of each candidate group. In particular embodiments, the ranking may be based on a total score which is based on individual component scores each calculated for a distinct feature of the candidate group. As an example and not by way of limitation, social-networking system 160 may calculate a likelihood that the particular user will subsequently post, like, or comment in the candidate group after being presented with the candidate group in a recommendation. This likelihood may be represented as the chances of interactions in a particular period of time, e.g. the likelihood that the user will share a post in the candidate group within a month of being presented with the recommendation. Social-networking system 160 may calculate the likelihood of interaction based on factors like the rate of posts/likes/comments in the group for other members, and the rate of posts/likes/comments for the particular user in his or her current groups. In particular embodiments, social-networking system 160 may further distinguish the likelihood that the user will interact with the candidate group based on the user's interactions with similar groups to the candidate group. As an example and not by way of limitation, user A may be a member of two groups B and C, where B is a school alumni group, and C is a professional networking group. If social-networking system 160 is ranking a candidate group D which is a school football team group, social-networking system 160 may calculate a likelihood that user A will interact with group D based on user A's interactions with group B, but not group C. Social-networking system 160 may determine that user A's interactions in group C is not a good predictor of how user A will behave with respect to group D.

In particular embodiments, the likelihood of the particular user's interaction may be represented by a score, wherein a higher score represents a greater likelihood of interaction. In particular embodiments, social-networking system 160 may treat each type of interaction separately and assign separate scores to the likelihood of each action. This may allow one or more of the actions to be more heavily weighted in score than the others. As an example and not by way of limitation, social-networking system 160 may use a scoring model where the likelihood of posting in the candidate group is scored more highly than the likelihood that the user will like a post or comment in the candidate group.

In particular embodiments, social-networking system 160 may rank the candidate groups comprising the recommendation list by calculating feature scores based on the filtering criteria and information used by one or more candidate recommendation sources. In the previous steps, the filtering criteria and candidate recommendation sources may be used to determine if a candidate group should or should not be recommended. In the ranking step, how well a candidate group matches filtering criteria or factors for a candidate recommendation source may be used to calculate a score for ranking purposes. As an example and not by way of limitation, social-networking system 160 may consider the average feedback per post in a candidate group, wherein a higher rate of feedback per post (e.g. likes and comments per post) will result in a higher feature score for the candidate group. This may allow for differentiation of two groups that both passed the particular filter criteria in the initial groups inventory step. As an example and not by way of limitation, two groups A and B may have both passed the filter criteria for feedback per post, which may be at least two likes/comments per post. However, group A may have an actual rate of feedback of 10 likes/comments per post, while group B may only have 3 likes/comments per post. In the ranking step, social-networking system 160 may assign group A a higher feature score than group B for this feature, so that if all else is equal, group A will be ranked higher than group B. In particular embodiments, social-networking system 160 may use some or all of the filtering criteria used to determine the groups inventory as scoring functions to calculate at least one feature score, each feature score corresponding to a filtering criteria.

In particular embodiments, social-networking system 160 may apply one or more candidate recommendation sources to the recommendation list of candidate groups for ranking purposes. The candidate recommendation source applied may not be the candidate recommendation source that submitted the candidate group for recommendation. As an example and not by way of limitation, candidate group A may have been submitted through the Topic-based source, while candidate group B was submitted by the Profile source. Social-networking system 160 may calculate a feature score for groups A and B that corresponds to the number of the particular user's friends who are members of each group, e.g. the Friends source. In this example, if candidate group A has five friends as members while candidate group B has two friends, candidate group A may receive a higher feature score for this feature. In particular embodiments, social-networking system 160 may use the social affinity and coefficient determination used by the Friends source, to calculate a feature score for the candidate groups based on the social affinity or coefficient of the members of each group with respect to the particular user. In particular embodiments, social-networking system 160 may use some or all of the candidate recommendation sources used to determine the recommendation list of candidate groups as scoring functions to calculate at least one feature score, each feature score corresponding to a candidate recommendation source.

In particular embodiments, social-networking system 160 may use one or more feature scores calculated as described above to calculate a ranking score for each candidate group, then rank the candidate groups in the recommendation list by their respective ranking scores. In particular embodiments, social-networking system 160 may assign different weights to different feature scores depending on the perceived importance of the respective feature to the overall relevance to the particular user and the likelihood that the user will interact with the candidate group. In particular embodiments, social-networking system 160 may use a machine-learning method to adjust the algorithm used to calculate the ranking score. The machine-learned method may take as inputs the current scoring algorithm to calculate the ranking score and the subsequent responses by the users when presented with the ranked recommendation list based on the current scoring algorithm. Based on the users' responsive actions (e.g. user A joined the top ranked group, user B viewed the seventh-ranked group, user C did not select any of the recommended groups, etc.), the social-networking system 160 may use the machine-learning method to adjust the weights of one or more feature scores to correlate more closely with the users' responses.

In particular embodiments, after groups are recommended to users, social-networking system 160 may collect the data on the responses by those users. As an example and not by way of limitation, responses to the suggestions may include clicks, group joins, group leaves, or views/posts/likes/comments in the group. Social-networking system 160 may treat each type of response as a label, and train a boosted decision tree model with the group level, user level, or group and user level features as described above. In particular embodiments, a variety of models may be used, separately or in a combination. In particular embodiments, the combination of models may be weighted based on the perceived impact of each model to the overall recommendation. As an example and not by way of limitation, models may include a click model, which predicts the probability that the user will click the particular group that is presented as a recommendation; a conversion model, which predicts the probability that the user will request to join the group after being presented with the group recommendation; an approval model, which predicts the probability that the user's join request to join the recommended group will be approved by the administrators of that group; or an engagement model, which predicts the probability that the user will post/comment/like in the group after the join request is approved by the group administrators.

Figure 8A:
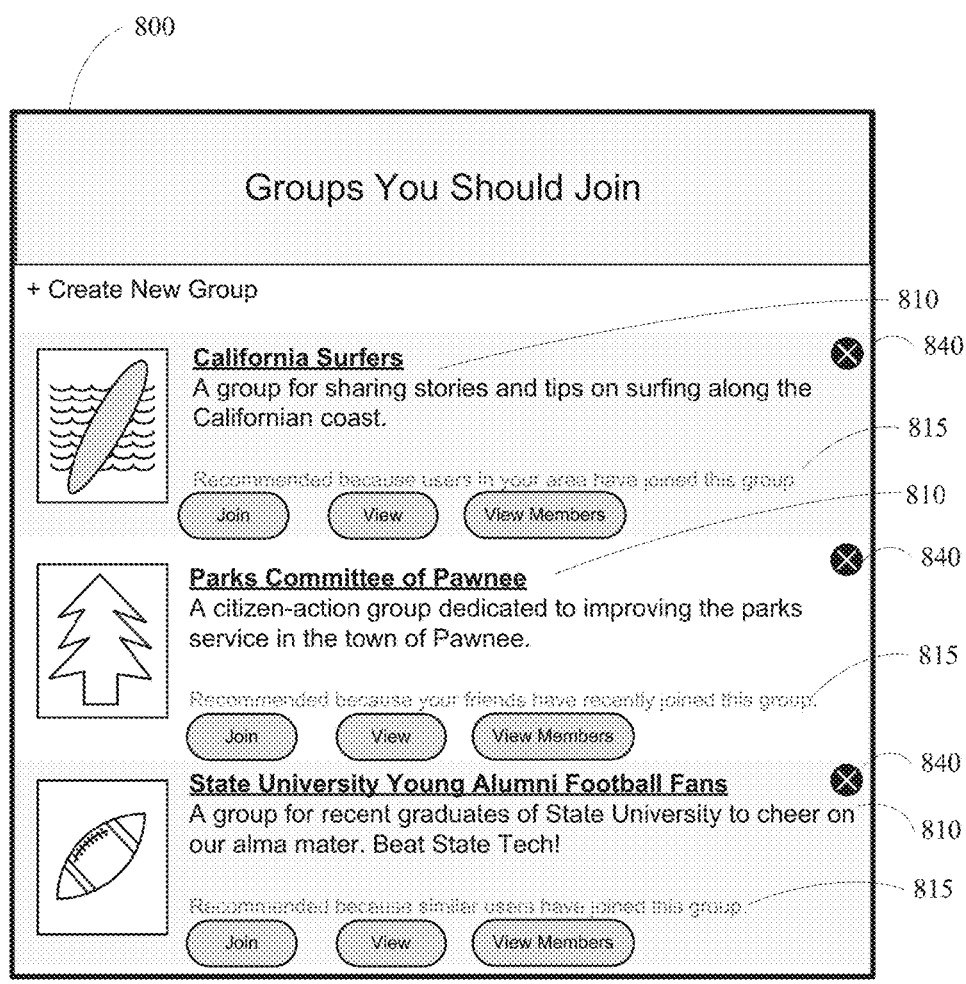
FIG. 8A illustrates an example user interface for presenting group recommendations to a user.

FIG. 8A illustrates an example user-interface 800 of social-networking system 160 displaying a set of ranked candidate groups to a user of social-networking system 160. A user-interface may be accessed by a user through a web browser or an application on a computing device. A user may be presented with one or more recommended groups 810 for the user to join. Each recommended group 810 may be displayed with a title and description, a picture if one is available, and options for the user to interact with the group, e.g. by joining the group, viewing the group, or viewing members. Each recommended group 810 may also be displayed with an explanation 815 of why the group is being recommended to the user. In particular embodiments, the explanation 815 may describe the source that submitted the particular group as a candidate group. In particular embodiments, the explanation 815 may describe the reason that the group has its current ranking, e.g. an explanation of why this group is relevant to the user. In particular embodiments, the explanation 815 may be a combination of both the source and the reason for ranking. In particular embodiments, each recommended group 810 may have an associated element 840 which would allow a user to x-out the recommendation. In response to the user selecting element 840, social-networking system 160 may remove the particular recommended group 810 from the user-interface 800. Additionally, the user's selection of element 840 would be added as an input to calculate the number of recent x-outs or a recent x'ing-out rate as discussed above to determine if the particular group should be removed from the groups inventory.

Figure 8B:
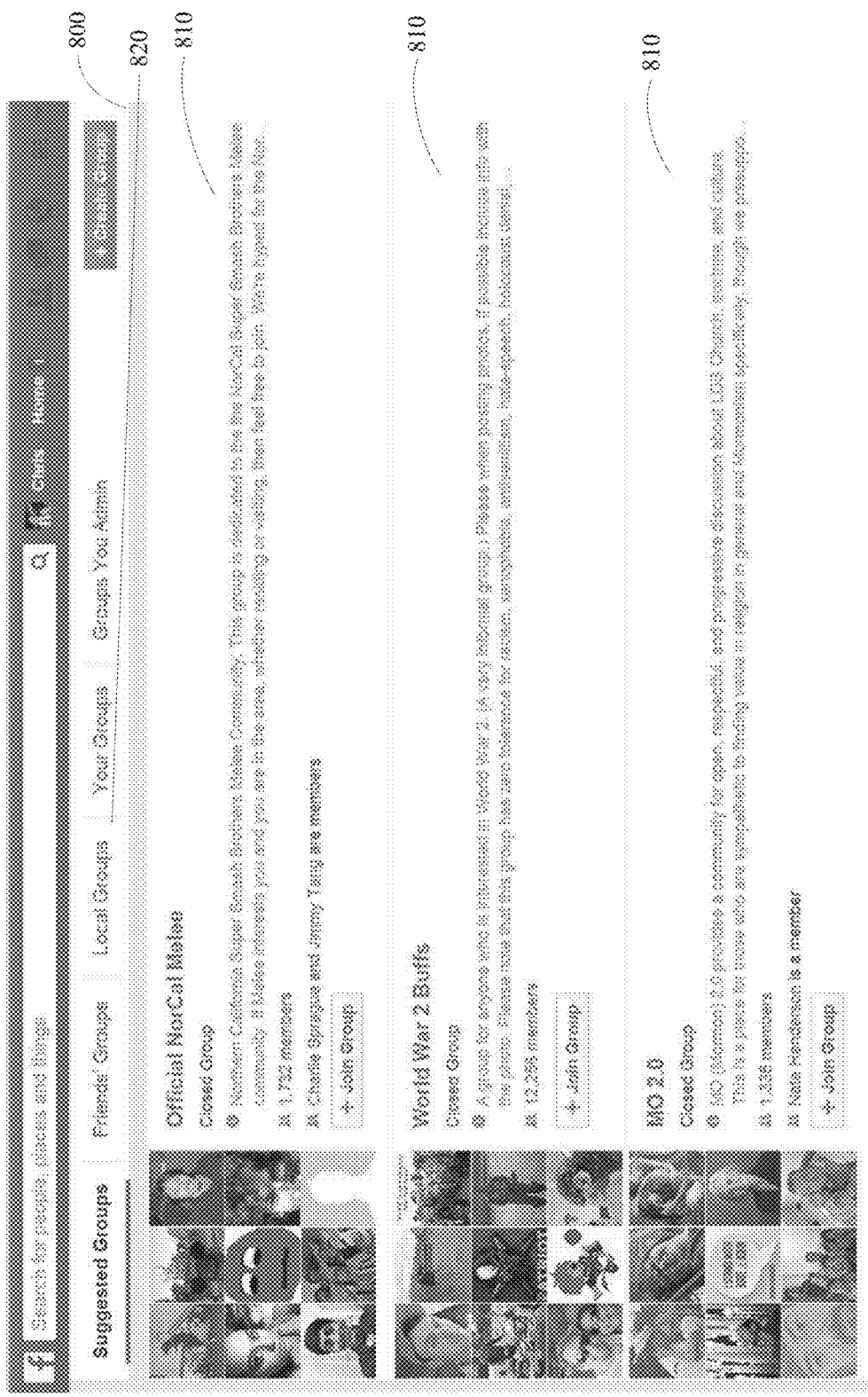
FIG. 8B illustrates an example user interface for users to interacts with groups on a social-networking system.

FIG. 8B illustrates another example user-interface 800 of social-networking system 160 that may allow a user to interact with groups in social-networking system 160, including group recommendations. A user-interface may be accessed by a user through a web browser or an application on a computing device. A user may be presented with a list of candidate groups 810 wherein the user has the option to join each of the presented candidate groups 810. Each candidate group 810 may have an associated image, a title, and a description. In the example of FIG. 8B, the description may indicate to the user if the group is open or closed, how many members are in each group, and an indication if any friends of the user are members of the group. The user-interface 800 may also comprise a tab 820 which allows the user to select between suggested groups, groups that have been joined by friends of the user, groups that have been joined by other users in the same locality as the user, the groups that the user has already joined, and groups that the user is an administrator for.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 9:
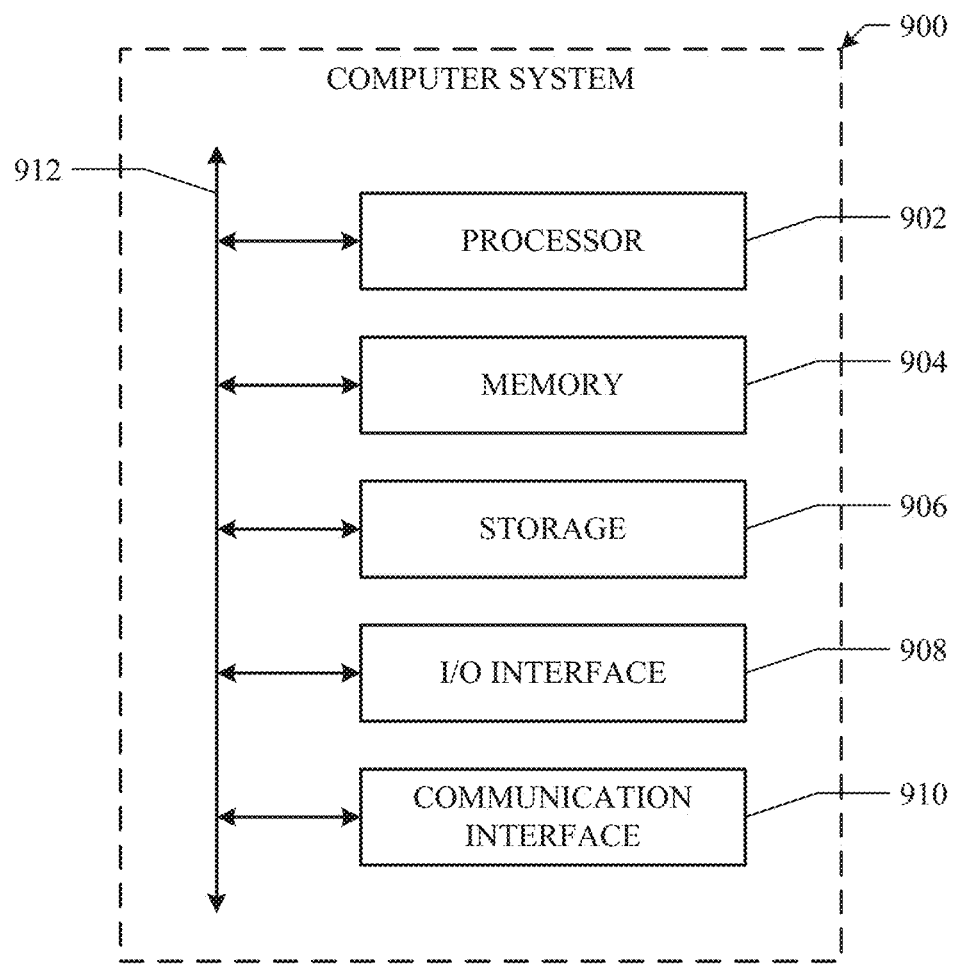
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by one or more computing devices, accessing a set of user groups of a social-networking system;
   by one or more computing devices, determining a first subset of the user groups for a particular user of the social-networking system based on a first set of filtering criteria, wherein:
   the first set of filtering criteria comprises one or more group-specific filters regarding characteristics of individual groups, and one or more user-specific filters associated with characteristics of the particular user; and a particular user group is added to the first subset if the particular user group passes the one or more group-specific filters through one or more of a weak AND (WAND) operator and a strong OR (SOR) operator as weighted search constraints and passes the one or more user-specific filters, wherein to pass through one or more of the WAND and SOR operators includes at least passing a first group-specific filter or second group-specific filter by a first predetermined amount, and wherein to pass through the one or more of the WAND and SOR operators includes at most failing the first group-specific filter or the second group-specific filter by a second predetermined amount;

by one or more computing devices, applying a plurality of recommendation-source processes to the first subset to determine a plurality of second subsets of the first subset, wherein:

each of the recommendation-source processes respectively determines a particular second subset of user groups by comparing the first subset to a second set of filtering criteria that is specific to each recommendation-source process;

each of the recommendation-source processes represents a particular recommendation source; and each of the recommendation-source processes determines a predetermined number of user groups for its respective second subset;

by one or more computing devices, combining the second subsets into a list of user groups;

by one or more computing devices, ranking the list of user groups; and by one or more computing devices, sending the list of user groups as ranked to the particular user, wherein sending the list of user groups further comprises sending an explanation for each user group of the list of user groups why a particular group is recommended to the particular user.

2. The method of claim 1, wherein:
the social-networking system is associated with a plurality of users;
the social-networking system comprises a graph that comprises a plurality of nodes and a plurality of edges connecting the nodes;
some of the nodes each correspond to one of the user groups; and
some of the nodes each correspond to one of the users.

3. The method of claim 1, wherein comparing the first subset to the second set of filtering criteria comprises comparing the first subset with:
a user group joined by friends of the particular user;
a user group joined by users sharing common membership in another user group with the particular user;
a user group joined by users determined to have a common interest with the particular user;
a user group joined by users having a location or age in common with the particular user;
a user group joined by users having profile information in common with the particular user;
a user group associated with a topic that is associated with the particular user;
a user group having a co-interaction association with another user group associated with the particular user;
a user group having a co-interaction association with a page associated with the particular user; or
a user group viewed by the particular user.

4. The method of claim 1, wherein the one or more group-specific filters are based at least in part on:

a most recent activity for a user group;
a number of members of a user group;
a most recent writing activity for a user group;
a rate of activities in a user group; or
a membership type of a user group.

5. The method of claim 4, wherein the rate of activities in the user group comprises:
a rate of posts in the user group over a predetermined period of time;
a rate of comments or likes per post in the user group over a predetermined period of time; or
a rate of views in the user group over a predetermined period of time.

6. The method of claim 4, wherein the membership type of the user group comprises:
an open user group;
a closed user group;
a secret user group;
a disabled user group; or
an empty user group.

7. The method of claim 4, wherein the most recent writing activity for a user group comprises a date of a most recent post shared to the user group by a member of the user group.

8. The method of claim 4, wherein the most recent activity for a user group comprises:
a date of a most recent post, like, or comment in the user group; or
a predetermined number of posts, likes, or comments in the user group over a predetermined period of time.

9. The method of claim 1, wherein at least one recommendation source is updated in response to an action on the social-networking system by the particular user, the action comprising:
a new group joined by the particular user;
a view of a group by the particular user on the online social network;
a post shared to the online social network by the particular user;
a second user being added as a friend by the particular user;
a like or comment shared by the particular user; or
a profile update for the particular user.

10. The method of claim 1, wherein a particular user group is excluded from the first subset based on a language filter.

11. The method of claim 1, wherein a particular user group is excluded from the first subset based on at least one previous list of user groups comprising the particular user group being sent to a user of the social-networking system.

12. The method of claim 11, further wherein the particular user group is excluded from the first subset based on one or more actions of the user of the social-networking system in response to receiving the at least one previous list of user groups.

13. The method of claim 1, wherein a particular user group is excluded from the first subset based on previous activities of the particular user in association with the particular user group.

14. The method of claim 1, wherein a particular user group is excluded from the first subset based on one or more administrative-approval factors for the particular user group, wherein the administrative-approval factors comprise:
a number of users waiting to be admitted into the particular user group;
a number of group join requests by the particular user awaiting administrative action; or a rejection rate of new members for the particular user group.

15. The method of claim 1, wherein ranking the list of user groups is based at least in part on:
   a probability that the particular user will interact with a particular user group;
   a social affinity or coefficient of a particular user group with respect to the particular user; or
   a ranking score for a particular user group with respect to the particular user, the ranking score comprising one or more feature scores, wherein the feature scores are based at least in part on one or more characteristics of the user group.

16. The method of claim 15, wherein the ranking score is calculated through a machine-learning process.

17. The method of claim 1, wherein combining the second subsets further comprises:
   de-duplicating one or more identical groups in each of the second subsets; and
   requesting, in response to de-duplicating one or more identical groups, additional user groups from each of the recommendation-source processes to determine the predetermined number of user groups.

18. One or more computer-readable non-transitory storage media embodying software that is operable when executed to:
   access a set of user groups of a social-networking system;
   determine a first subset of the user groups for a particular user of the social-networking system based on a first set of filtering criteria, wherein:
   the first set of filtering criteria comprises one or more group-specific filters regarding characteristics of individual groups, and one or more user-specific filters associated with characteristics of the particular user; and
   a particular user group is added to the first subset if the particular user group passes the one or more group-specific filters through one or more of a weak AND (WAND) operator and a strong OR (SOR) operator as weighted search constraints and passes the one or more user-specific filters, wherein to pass through one or more of the WAND and SOR operators includes at least passing a first group-specific filter or second group-specific filter by a first predetermined amount, and wherein to pass through the one or more of the WAND and SOR operators includes at most failing the first group-specific filter or the second group-specific filter by a second predetermined amount;
   apply a plurality of recommendation-source processes to the first subset to determine a plurality of second subsets of the first subset, wherein:
   each of the recommendation-source processes respectively determines a particular second subset of user groups through a comparison of the first subset to a second set of filtering criteria that is specific to each recommendation-source process;
   each of the recommendation-source processes represents a particular recommendation source; and
   each of the recommendation-source processes determines a predetermined number of user groups for its respective second subset;
   combine the second subsets into a list of user groups;
   rank the list of user groups; and
   send the list of user groups as ranked to the particular user, wherein sending the list of user groups further comprises sending an explanation for each user group of the list of user groups why a particular group is recommended to the particular user.

19. A system comprising:
   one or more processors; and
   a memory coupled to the processors comprising instructions executable by the processors, the processors being operable when executing the instructions to:
   access a set of user groups of a social-networking system;
   determine a first subset of the user groups for a particular user of the social-networking system based on a first set of filtering criteria, wherein:
   the first set of filtering criteria comprises one or more group-specific filters regarding characteristics of individual groups, and one or more user-specific filters associated with characteristics of the particular user; and
   a particular user group is added to the first subset if the particular user group passes the one or more group-specific filters through one or more of a weak AND (WAND) operator and a strong OR (SOR) operator as weighted search constraints and passes the one or more user-specific filters, wherein to pass through one or more of the WAND and SOR operators includes at least passing a first group-specific filter or second group-specific filter by a first predetermined amount, and wherein to pass through the one or more of the WAND and SOR operators includes at most failing the first group-specific filter or the second group-specific filter by a second predetermined amount;
   apply a plurality of recommendation-source processes to the first subset to determine a plurality of second subsets of the first subset, wherein:
   each of the recommendation-source processes respectively determines a particular second subset of user groups by comparing the first subset to a second set of filtering criteria specific to each recommendation-source process;
   each of the recommendation-source processes represents a particular recommendation source; and
   each of the recommendation-source processes determines a predetermined number of user groups for its respective second subset;
   combine the second subsets into a list of user groups;
   rank the list of user groups; and
   send the list of user groups as ranked to the particular user, wherein sending the list of user groups further comprises sending an explanation for each user group of the list of user groups why a particular group is recommended to the particular user.

* * * * *